Patented July 18, 1933

1,918,619

UNITED STATES PATENT OFFICE

JUNICHI SUZUKI, OF KYOTO-FU, JAPAN, ASSIGNOR TO GUNZE SEISHI KABUSHIKI KWAISHA, OF KYOTO-FU, JAPAN

PROCESS OF PRODUCING MICROSCOPIC SPECIMENS FOR THE OBSERVATION OF THE SURFACES OF SUBSTANCES

No Drawing. Application filed December 26, 1930, Serial No. 505,002, and in Japan January 25, 1930.

This invention relates to the process of manufacturing specimen images in films or thin sheets, to be used for the microscopic observation of the surfaces of substances, and has especial reference to amyl acetate solutions of celluloid or the like which are applied over any surfaces and solidify, thus giving transparent thin specimen images, with exact negative fac-similes of any surfaces to be microscopically examined.

The characteristic features of the present invention, are as follows:

Certain chemical solutions like amyl acetate solutions of celluloid, are applied over and pressed against the surfaces of any solid or animate substances to be microscopically examined. These solutions are to be of plastic nature, have to adhere well to the surfaces and when they solidify, will remain transparent and retain their original shapes, there being no contraction or expansion.

Through the volatilization of the solutions, thin, transparent films are formed over the surfaces, if desired, the solutions may be applied directly over thin celluloid sheets which may be pressed over the surfaces of substances, forming the fac-simile stamps on the sheets.

Thus the negative fac-similes exactly corresponding to the contours of the said surfaces of the substances or animate objects, will be produced on the films or thin sheets.

The object of this invention is to utilize the transparent films or sheets thus formed as microscopic specimen images, in order to make microscopic observation of the negatives of the surfaces of the substances, and thereby know the exact contours or features of the original surfaces, thus dispensing with the use of complicated devices like metal microscope or cutting off the slices of the substances to be examined and other troublesome process, especially in animate objects. Microscopic specimens of any surfaces, are easily made and this process may be applied to silk worms, silk worm eggs, mulberry leaves, thus rendering it useful in the classification and examination of various substances, with the view of improving their qualities.

According to the present invention, in examining microscopically the contour of the surfaces of solid substances or animate objects such as silk worms, silk worm eggs, mulberry leaves etc., and in making simple, transparent sample images in films or sheets, in order to make the said microscopic examinations, without the use of special microscope or any other special devices, amyl acetate solutions of celluloid may be used. These solutions which adhere well to the applied surfaces when solidifying, and which retain their original shapes and which are transparent and plastic, are applied over and pressed against the surfaces and through natural volatilization of the solutions, transparent thin films will be formed.

These films may be stripped off or, if desired, thin celluloid sheets applied with the solutions, pressed against the surfaces of solid substances and thus stamped with the negative fac-similes of the original substances, may be stripped off and then used as the specimen images for the ordinary microscopic observations.

The above is the distinctive, characteristic feature of this invention. I may mention that water, oil or other fixative materials will not be needed for the formation of specimens.

In the present invention, the solutions to be used, must be of plastic nature and in solidifying under the volatilization must not contract, expand or change the original shapes. They have to adhere well to any substances and must be easily stripped off.

The best and appropriate material which will satisfy the above mentioned conditions, will be celluloid solutions as mentioned above. If desired viscose solutions may be used. When the specimen images manufactured according to the present method are observed under ordinary microscope, minute contours of the images will produce optical differentiation and thus I am able to make clear and precise observation of the contours of the surfaces of the substances.

If desired these may be utilized through micro-photographs on sensitized dry plates, according to the usual manner. Thus it will be seen that as the negative features of the transparent, thin specimen images are precisely similar to those of the original substances, the same result will be obtained as though I make the direct observation of the original substances. Ordinarily, in order to make microscopic observation of the surfaces of non-transparent substances, I have to use complicated arrangement such as metal microscope, or else slice off the surfaces of substances or work out microscopic specimen which involve great deal of trouble and difficulty.

In the present method, I need not go into such complications and troubles and I could very easily work out specimen images, which give exact and minute features. This process I could repeat for a number of times without much difficulty.

Especially in observing the surfaces of animal or vegetable bodies, I may easily produce specimens of animate objects and I have further advantages that the specimens are not breakable as glass specimens as they are light and transportable.

The inventor is aware of a process of making a celluloid model specimen by injecting celluloid solutions into distribute veins of an animal, such as pulsation and trachea, and after solidification of the solution, dissolving off the portion constituting the distribute veins with acid solvent, thus leaving celluloid model specimen behind.

The present invention is entirely different from the process mentioned above, as it is evident that the present process is not to inject plastic solutions into the interior of the distribute veins, but only to smear transparent celluloid solutions over the surfaces of solid or animate objects and after solidification, strip off thin films or sheets available for microscopic specimens and giving exact negative fac-similes.

Therefore the main object and the nature of the inventions are entirely different in two above mentioned cases.

According to the present invention, microscopic specimen images which may be used for observing the surface features of animate objects in their living state, may easily be manufactured.

This process if applied to silk worms, silk worm eggs, mulberry leaves and other industrial materials, will afford the means of classifying the materials and inspecting the health conditions of animate objects etc., and be quite beneficial for the improvements of their qualities and increase of efficiency of industrial works.

Having now particularly described and ascertained the nature and object of the present invention, what I claim is as follows:—

Process of manufacturing film facsimiles of objects for microscopic observations, without use of fixture materials, which process consists in first applying a transparent, plastic solution over the surface of the object to be observed, said solution being of the amyl-acetate celluloid type having the tendency of adhering to said surface without deformation when solidifying; then causing said plastic solution to solidify by volatilizing the solvents; thereupon removing the formed thin strips of film, thus producing an accurate negative facsimile of said surface.

JUNICHI SUZUKI.